United States Patent [19]

Pfizenmaier et al.

[11] Patent Number: 6,037,894
[45] Date of Patent: *Mar. 14, 2000

[54] MONOSTATIC FMCW RADAR SENSOR

[75] Inventors: Heinz Pfizenmaier, Leonberg, Germany; Paul Lowbridge, Lincoln, United Kingdom; Brian Prime, Lincoln, United Kingdom; Colin Nash, Lincoln, United Kingdom; David Dawson, Waddington, United Kingdom

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/808,075

[22] Filed: Feb. 28, 1997

[30] Foreign Application Priority Data

| Jul. 1, 1995 | [DE] | Germany | 195 24 058 |
| Aug. 16, 1995 | [DE] | Germany | 195 30 065 |

[51] Int. Cl.⁷ .................................................. G01S 13/93
[52] U.S. Cl. ........................... 342/70; 342/128; 342/175
[58] Field of Search .............................. 342/70, 71, 72, 342/175, 128; 343/700 MS

[56] References Cited

U.S. PATENT DOCUMENTS

| 5,481,258 | 1/1996 | Higgins | 342/70 |
| 5,486,832 | 1/1996 | Hulderman | 342/70 |
| 5,583,511 | 12/1996 | Hulderman | 342/175 |
| 5,587,713 | 12/1996 | Pfizenmaier et al. | 342/70 |

FOREIGN PATENT DOCUMENTS

| 0 634 667 | 1/1995 | European Pat. Off. . |
| 0 685 930 | 12/1995 | European Pat. Off. . |
| 44 12 770 | 10/1995 | Germany . |

OTHER PUBLICATIONS

International Microwave Symposium Digest (MTT–S), Albuquerque, Jun. 1–5, 1992, Vol. 2, Jun. 1 1992, Reid Dw, pp. 721–724 Williams, D.A.: "Millimetre Wave Eadars for Automotive Applications".
Patent Abstraxt of Japan, Vol. 003, No. 077 (E–120), Jun. 30, 1979 & JP, A, 54 053891 (Hitachi Ltd), Apr. 27, 1979.

*Primary Examiner*—John B. Sotomayor
*Attorney, Agent, or Firm*—Michael J. Striker

[57] ABSTRACT

According to the invention, a monostatic FMCW radar sensor for a vehicle for detecting objects is proposed in which at least one antenna feed in combination with a dielectric lens is embodied for both transmitting and receiving a corresponding echo signal. At least one antenna feed is connected to a ring mixer via a ratrace ring or double ratrace ring, so that an expensive circulator can be dispensed with. The high-frequency structure is advantageously embodied in planar microstrip form. A plurality of transmission and reception antennas are focused via one common lens.

18 Claims, 4 Drawing Sheets

MONOSTATIC FMCW RADAR SENSOR

BACKGROUND OF THE INVENTION

The invention is based on a FMCW radar sensor for a vehicle for detecting objects. It is already known to use one common antenna for a FMCW radar sensor for both transmission and reception. The transmission and reception signals are separated with a circulator produced by waveguide technology. Such technologies are quite expensive and can therefore be used only for special cases but not for simple vehicle applications.

European Patent Disclosure EP 498 542 A2 also discloses a bistatic FMCW radar sensor, in which separate transmitting and receiving antennas have been proposed. With this arrangement, it is true that the expensive circulator can be dispensed with. It is disadvantageous, however, that in this sensor separate antennas are necessary for transmission and reception, with two dielectric lenses. As a result, the expense is again increased.

The FMCW radar sensor according to the invention for a vehicle for detecting one or more objects has the advantage over the prior art that on the one hand the same antennas can be used for transmission and reception. On the other, the expensive circulator for separating the transmission and reception signals is not needed, resulting in a simple design for the FMCW radar sensor. It is also especially advantageous that the microstrip form makes the design very inexpensive. Complicated work to adjust the antennas is also eliminated.

Advantageous further features of and improvements to the FMCW radar sensor disclosed in the main claim are possible as a result of the provisions recited in the dependent claims. It is especially favorable that the illumination of the lens in transmission and reception is improved by the dielectric polyrod antenna.

The lens advantageously has an elliptical shape, so that particularly in an optimized antenna array, the lens is fully illuminated. As a result, the target will not be lost even if the vehicle has a strong tendency to rocking, since the target is always within the radiation range of of the antennas.

By rotating the side-by-side antennas (antenna feeds) by an angle of about 45° relative to the lens axis, a decoupling from objects that must for instance be distinguished from oncoming motor vehicles on a road is accomplished in a simple way. For decoupling the antenna feeds from one another in an embodiment with three antenna feeds, conversely, the middle antenna feed can advantageously be disposed rotated by about 135°.

It is also advantageous to switch the Gunn oscillator from the waveguide plane to the microstrip plane via a tapping transformer. Simple coupling of the high-frequency signals is thereby accomplished.

To reduce the mean transmission power, the transmission power can be blanked after the conclusion of the ramp function. The Gunn oscillator is then varied linearly in its frequency only during the ramp times.

It is also advantageous, particularly in a multiramp method, to embody the ramp function as trapezoidal or triangular, so that objects located at various distances can be more easily recognized.

With the aid of the evaluation circuit, not only the vehicle speed, distance and driving angle but also the relative distance from the detected object can be determined.

By incorporating the FMCW radar sensor in a hermetically sealed housing, the vulnerable components are protected against such external factors as dirt and moisture. To compensate for the pressure differences arising from temperature fluctuations, a pressure compensation element is provided, which is advantageously disposed on the outer wall of the housing. As a result, a constant internal pressure is largely achieved, thereby averting dew formation in the housing.

A preferred application of the FMCW radar sensor is to measure distance when the sensor is used in combination with a vehicle speed controller, or as an aid in parking a motor vehicle.

BRIEF DESCRIPTION OF THE DRAWING

One exemplary embodiment of the invention is shown in the drawing and described in further detail in the ensuing description.

DESCRIPTION OF THE PREFERRED EMBODIMENT

Figure 1:
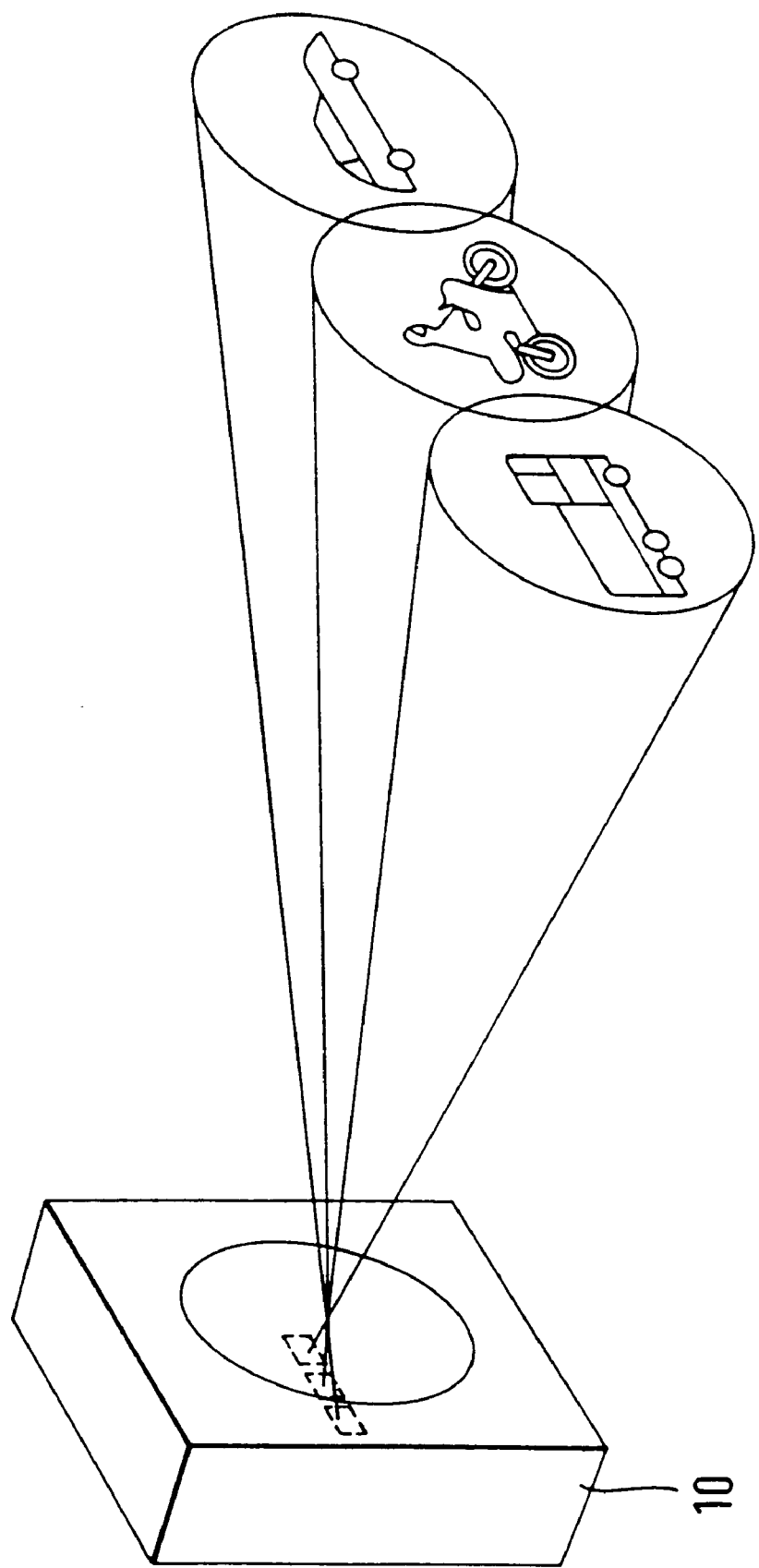
FIG. 1 shows a first exemplary embodiment.

FIG. 1 shows a housing 10 of a FMCW radar sensor, with three radiating lobes located side by side. The radiating lobes may partly overlap, and they represent the active area in which an object can be detected. When used in a motor vehicle, it is thus possible to detect a plurality of objects simultaneously. A distinction can be made as to whether the objects are moving in the direction of travel of the motor vehicle, are standing still at the edge of the road, or are oncoming. A corresponding application in ship travel is alternatively contemplated as well.

Figure 2:
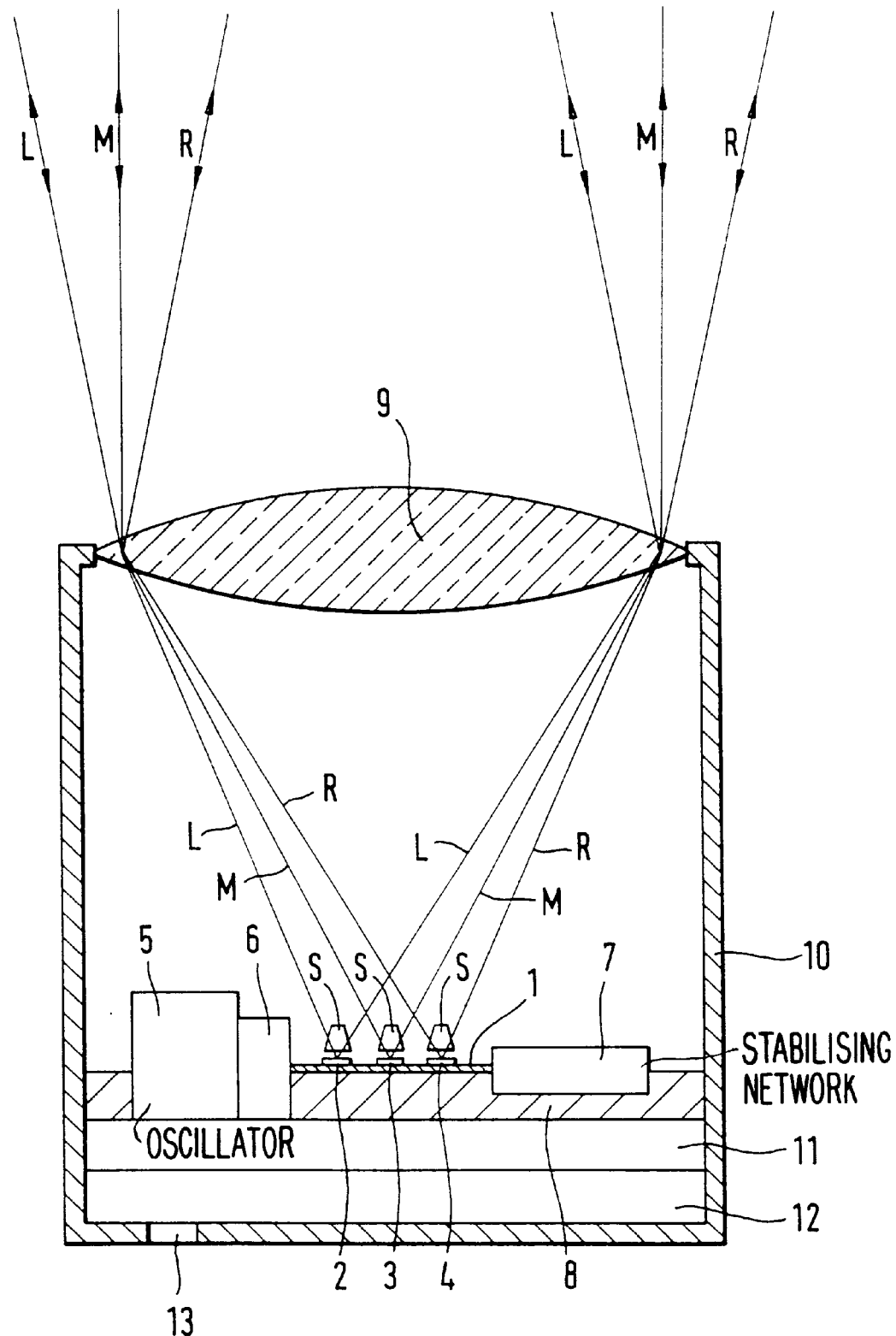
FIG. 2 shows a sectional view of the exemplary embodiment.

FIG. 2 shows a FMCW radar sensor in the form of a monostatic sensor in a sectional view. The housing 10 is preferably hermetically sealed, with an opening provided on one side for a dielectric lens 9. A pressure compensation element 13 is disposed at a suitable point of the wall, circumference or bottom of the housing 10. A base plate 8 is provided inside the housing 10, and in the middle region of the base plate at least one and preferably three transmission/reception antenna feeds 2, 3, 4 disposed side by side are embodied in microstrip form for the common lens. The antenna feeds 2, 3, 4 may also be embodied as an antenna feeds array or so-called patch arrays. For beam concentration, dielectric polyrod antennas S may also be mounted on the at least one antenna 2, 3, 4. A stabilizing network 7 is also provided, with which the frequency of the Gunn oscillator 5 is linearized and stabilized for the multiple ramp method. Between the Gunn oscillator 5 and the microstrip line 1, a tapping transformer 6 is provided, which transmits the high frequency of the Gunn oscillator 5, made by waveguide technology, to the structure of the lateral microstrip line 1. The structure is supported by a base plate 8. Located below the base plate 8 is an evaluation circuit 11, which evaluates the transmission and reception signals. Below the evaluation circuit 11, a connection plane 12 is provided, by way of which the various signals are carried to the outside to plug connectors or lines, not shown.

The transmission and reception antenna feeds 2, 3, 4 are disposed approximately centrally, such that they are located in the beam path of the dielectric lens 9. For better adaptation, the dielectric lens 9 is embodied elliptically. The propagation of the beams is shown schematically on the left as L, in the middle as M, and on the right as R. As a result of this arrangement of the antennas and the focal lengths of the dielectric lens 9, the various electromagnetic propagation lobes shown schematically in FIG. 1 are obtained.

Figure 3:
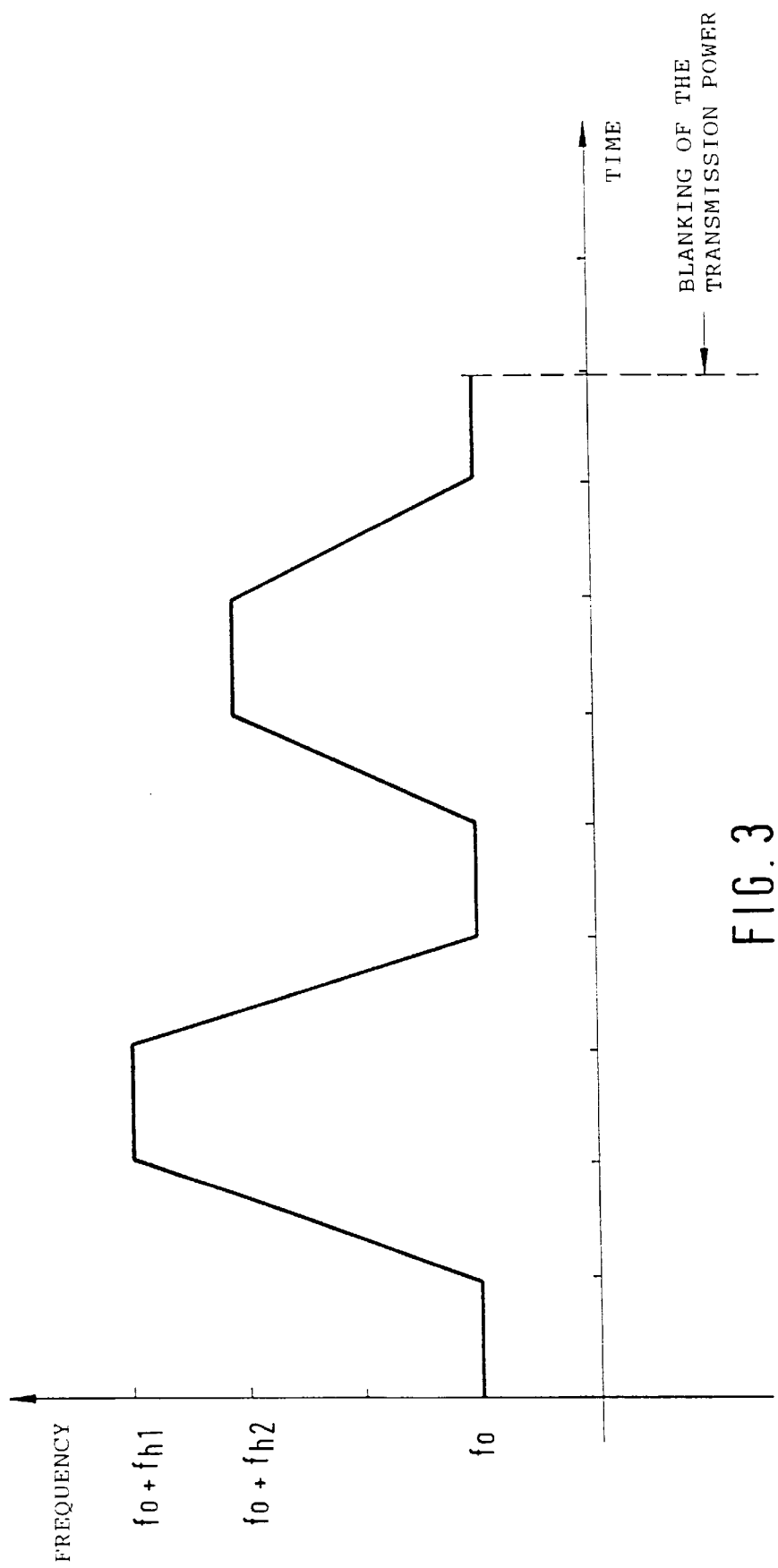
FIG. 3 shows a graph.
Figure 4:
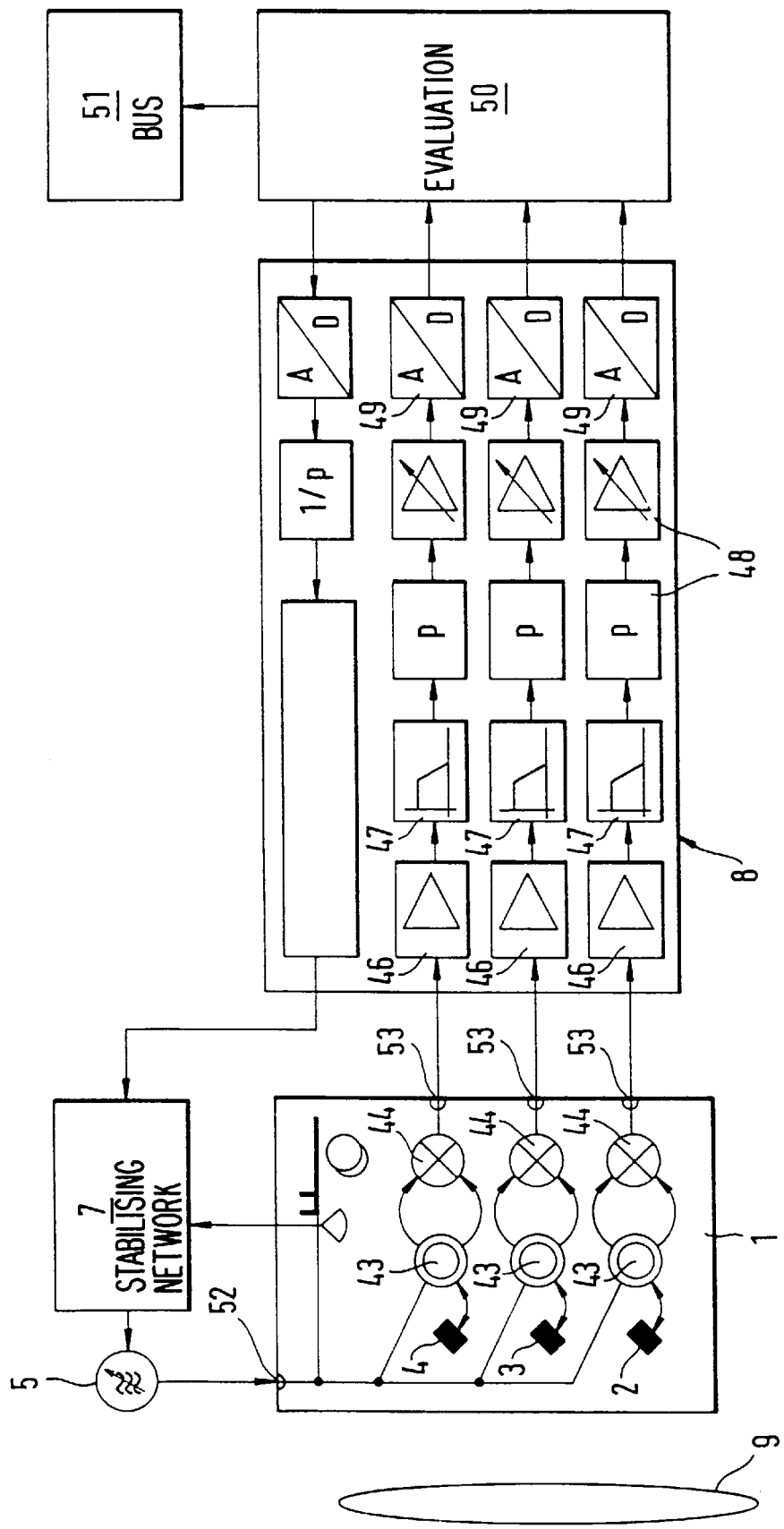
FIG. 4 shows a block circuit diagram.

The mode of operation of this array will now be described in further detail in conjunction with FIGS. 3 and 4. The Gunn oscillator 5 is triggered by the stabilizing network 7. The stabilizing network 7 includes a linearizing network with a frequency regulator, which as indicated by the graph in FIG. 3 specifies a curve for a frequency response with the frequency course shown in accordance with the multiramp method, for instance having four edges. By the multi-beam method, a lateral positional determination of objects, such as vehicles on curves is advantageously made possible as well. There is no need to pan the beam mechanically.

Once the trapezoidal frequency responses have been concluded, the transmission power of the Gunn oscillator 5 can alternatively be blanked, in order to reduce the mean energy expenditure. The process is then repeated for a new measurement. It is also contemplated that the frequency course be triangular, thereby omitting the apex at the two trapezoidal edges. This kind of triggering is advantageously generated with a voltage controlled frequency generator, which is generally known as a VCO generator. Typically, the Gunn oscillator 5 is produced by waveguide technology. Its output is coupled to an input 52 of the lateral structure of the microstrip line 1. The millimeter waves are coupled over suitable lines to three parallel-connected ratrace rings 43 and to the transmission and reception antenna feeds 2, 3, 4, so-called patches or patch arrays, connected to the rings. Upstream of the patches, dielectric polyrod antennas S can also be provided, to achieve better illumination of the dielectric lens 9. Better illumination of the lens 9 is also attained by the disposition of a plurality of patches in the form of an array.

The ratrace rings 43 may also be embodied as double ratrace rings. They are embodied in microstrip form as lateral rings, to which the transmission and reception antennas 2, 3, 4 are coupled. They serve the purpose of decoupling and mixing of the transmission and reception signals. Three transmission and reception antennas at a time of a patch array are each connected to one ratrace ring 43. The radar rays transmitted by the three transmission and reception antennas 2, 3, 4 are reflected from a vehicle ahead, for instance, and focused back onto the transmission and reception antennas 2, 3, 4 by means of the lens 9. Via the three ratrace rings 43 and ring mixers 44, the signals reach the three outputs 53 for further signal processing. Via the ring mixers 44, some of the energy of the Gunn oscillator 5 is diverted and mixed back into the baseband. The frequency of the Gunn oscillator 5 is dependent on statutory regulations. For instance, it is in the frequency range between 76 and 77 GHz. In this frequency band, only slight atmospheric damping of the electromagnetic oscillation occurs, so that for a low signal level, an adequate range of about 150 m is attained. The linearization of the frequency of the Gunn oscillator in the multiple ramp method employed is known per se and therefore need not be described in further detail. The linearization of the frequency rise can be done by circuitry in a frequency regulating loop. Alternatively, with the aid of Hilbert transformation, the linearity deviation and corresponding correction of the ramp function can be determined. This method is known for instance from German Patent Disclosure DE 40 40 572 A1.

The downward-mixed reception signals of the individual transmission and reception antennas 2, 3, 4, which signals are present at the three outputs 53 of the structure of the microstrip line 1, are advantageously evaluated in three separate channels, since these signals correspond to the various reception lobes with the objects detected in them. To that end, on a base plate 8, the signal is first amplified via an amplifier 46, filtered in a low-pass filter 47, and varied in a downstream weighting filter 48 in such a way that the distance-dependent drops in amplitude of the received signals are compensated for. After an A/D conversion in an A/D converter 49, the signal evaluation takes place in an evaluation 50 by a fast Fourier transform. This is advantageously done in a computer with a suitable control program. From the differences in frequency between the transmitted and simultaneously received waves, the distances to one or more objects are calculated. The speeds of the objects are calculated from the differences between the frequency differences during the leading and trailing edges, as shown in FIG. 3. By amplitude evaluation of the three spectra generated, a lateral resolution of the angular position of all the objects located in the position-finding field is calculated.

In another feature of the invention it is contemplated that the D/A converters, signal processors, and filters and amplifiers be embodied as a customer-specific circuit or ASIC. This evaluation circuit 11 is then disposed on the base plate 8 separately from the microstrip line 1. At the output of the evaluation 50, a bus 51, for instance a CAN (computer area network) bus, is provided, by way of which the values ascertained are carried on to suitable devices, such as gauges or displays, or control devices of the vehicle. The connection for the bus 51 is effected in the connection plane 12, as shown in FIG. 2.

It is provided in particular that the FMCW radar sensor be used to control a vehicle speed controller and/or a parking aid.

We claim:

1. A FMCW radar sensor for a vehicle for detecting one or more objects, comprising a housing; a Gunn oscillator; at least one antenna aligned with a dielectric for electromagnetic millimeter waves; an evaluation circuit, said at least one antenna being embodied for both transmission and reception of a corresponding echo signal; a ring mixer; a rat-race ring connecting said at least one antenna to said ring mixer, said at least one antenna and also at least one element selected from the group consisting of said rat-race ring and said ring mixer being embodied in planar microstrip form; and a dielectric polyrod antenna disposed between said at least one antenna and said lens.

2. A FMCW radar sensor as defined in claim 1; and further comprising two further antennas so as to provide in the FMCW radar sensor three such antennas.

3. A FMCW radarsensor as defined in claim 1, wherein said rat-race ring is a double rat-race ring.

4. A FMCW radar sensor as defined in claim 1, wherein said at least one antenna is embodied as an antenna array.

5. A FMCW radar sensor as defined in claim 4, wherein said at least one antenna array is formed for illuminating an elliptically shaped lens.

6. A FMCW radar sensor as defined in claim 2, wherein adjacent ones of said antennas are rotated by an angle of about 45° from a center axis of said lens.

7. A FMCW radar sensor as defined in claim 2, wherein a middle one of said three antennas is rotated by about 125° from a center axis of said lens.

8. A FMCW radar sensor as defined in claim 1; and further comprising a tapping transformer through which a transmission energy of said Gunn oscillator is coupled from a wave guide plane to said microstrip plane.

9. A FMCW radar sensor as defined in claim 1, wherein said Gunn oscillator is blankable after a conclusion of a ramp function.

10. A FMCW radar sensor as defined in claim 9 wherein said ramp function is embodied as a trapezoidal.

11. A FMCW radar sensor as defined in claim 9, wherein said ramp function is embodied as triangular.

12. A FMCW radar sensor as defined in claim 1, wherein said evaluation circuit is formed so that it compares transmission frequencies and reception frequencies, taking Doppler shifts into account, and from the comparison determines a relative distance from detected objects.

13. A FMCW radar sensor as defined in claim 1, wherein said housing is hermetically sealed.

14. A FMCW radar sensor as defined in claim 13, wherein said housing has an outer wall and is provided with a pressure compensation element on said outer wall.

15. A FMCW radar sensor as defined in claim 1, wherein the FMCW radar sensor is formed so that it is useable to control a vehicle speed controller.

16. A FMCW radar sensor as defined in claim 1, wherein said FMCW radar sensor is formed so that it is useable to control a parking aide.

17. A FMCW radar sensor for a vehicle for detecting one or more objects, comprising a housing; a Gunn oscillator; at least one antenna aligned with a dielectric for electromagnetic millimeter waves; an evaluation circuit, said at least one antenna being embodied for both transmission and reception of a corresponding echo signal; a ring mixer; a rat-race ring connecting said at least one antenna to said ring mixer and formed as a T/R diplexer, said at least one antenna and also at least one element selected from the group consisting of said rat-race ring and said ring mixer being embodied in planar microstrip form.

18. A FMCW radar sensor for a vehicle for detecting one or more objects, comprising a housing; a Gunn oscillator; at least one antenna aligned with a dielectric for electromagnetic millimeter waves; an evaluation circuit, said at least one antenna being embodied for both transmission and reception of a corresponding echo signal; a ring mixer; a double rat-race ring connecting said at least one antenna to said ring mixer, said at least one antenna and also at least one element selected from the group consisting of said double rat-race ring and said ring mixer being embodied in planar microstrip form, said double rat-race ring having one rat-race ring provided for said mixer and another rat-race ring provided for a diplexer.

* * * * *